(12) United States Patent
Lee et al.

(10) Patent No.: US 7,233,931 B2
(45) Date of Patent: Jun. 19, 2007

(54) FEATURE REGULATION FOR HIERARCHICAL DECISION LEARNING

(76) Inventors: Shih-Jong J. Lee, 15418 SE. 53rd Pl., Bellevue, WA (US) 98006; Seho Oh, 5025 145th Pl. SE., Bellevue, WA (US) 98006; Donglok Kim, 25330 SE. 36th Ct., Issaquah, WA (US) 98029

( * ) Notice: Subject to any disclaimer, the term of this patent is extended or adjusted under 35 U.S.C. 154(b) by 542 days.

(21) Appl. No.: 10/746,169

(22) Filed: Dec. 26, 2003

(65) Prior Publication Data
US 2005/0144147 A1 Jun. 30, 2005

(51) Int. Cl.
*G06F 15/18* (2006.01)
*G06N 3/08* (2006.01)
*G06K 9/64* (2006.01)

(52) U.S. Cl. .............................. 706/12; 706/25; 382/159
(58) Field of Classification Search .................. 706/12, 706/25; 382/159
See application file for complete search history.

(56) References Cited

U.S. PATENT DOCUMENTS

| | | | |
|---|---|---|---|
| 6,212,532 B1* | 4/2001 | Johnson et al. ............. | 715/500 |
| 6,941,288 B2* | 9/2005 | Lee et al. .................... | 706/12 |
| 7,031,948 B2* | 4/2006 | Lee .............................. | 706/14 |

OTHER PUBLICATIONS

Almuallim H. and Dietterich T.G., "Learning boolean concepts in the presence of many irrelevant features", Artifical Intelligence, 69(1-2):279-306, 1994.
Kononenko, I "Estimating attributes: Analysis and extensions of RELIEF", in Raedt Bergadano, ed, Proc. Euro Conf. Machine Learning, pp. 171-182, Italy, 1994, Springe-Verlag.
Kohavi R. and John G. "Wrappers for feature subset selection", Artificial Intelligence, 97(1-2), 1997.
Tsamardinos I. and Aliferis C.F. "Towards Principled Feature Selection: Relevancy, Filters, and Wrappers", in 9th Inte. Workshop on AI and Statistics. 2003. Key West, Florida.
Cardie C. "Using Decision Trees to Improve Case-Based Learning", In P. Utgoff, editor, Proc. 10th Inter. Conf. on Machine Learning, pp. 25-32, Amherst, MA Morgan Kaufmann, 1993.

* cited by examiner

*Primary Examiner*—Anthony Knight
*Assistant Examiner*—Michael B. Holmes

(57) ABSTRACT

A feature regulation application method for hierarchical decision learning systems receives feature regulation training data and invokes a plurality of hierarchical decision learning to create feature subset information output. The method receives learning data and uses the feature subset information and the learning data to create feature subset learning data output. The hierarchical decision learning method uses the feature subset learning data to create hierarchical decision output. The feature regulation method also outputs feature ranking information that can be used to create hierarchical decision output. The invention provides a computationally feasible method for feature selection that considers the hierarchical decision learning systems used for decision making.

8 Claims, 7 Drawing Sheets

FEATURE REGULATION FOR HIERARCHICAL DECISION LEARNING

TECHNICAL FIELD

This invention relates to a method for feature regulation for hierarchical decision learning.

BACKGROUND OF THE INVENTION

Decision learning is an important aspect in systems incorporating artificial intelligence. Many statistical, symbolic, connectionist and case-based learning algorithms have been used in a variety of applications with reasonable success. While most of the stable decision learning methods perform well on domains with relevant information, they could degrade in the presence of irrelevant or redundant information.

Selective or focused learning presents a solution to this problem. A key component of selective learning is selective attention through feature selection. The aim of the feature selection is to find a subset of features for learning that results in better performance than using all features for learning. Note that feature subset selection chooses a set of features from existing features, and does not construct new ones; that is, there is no feature extraction or construction.

From a purely decision theoretical standpoint, the question of which features to use is not of much interest. A Bayes rule, or a Bayes classifier, is a rule that predicts the most probable outcome for a given instance, based on the full distribution assumed to be known. The accuracy of the Bayes rule is the highest possible accuracy, and it is mostly of theoretical interest. The optimal Bayes rule is monotonic, i.e., adding features cannot decrease accuracy, and hence restricting a Bayes rule to a subset of features is never advised.

In practical learning scenarios, however, we face two problems: the learning algorithms are not given access to the underlying distribution, and most practical algorithms attempt to find a hypothesis by approximating NPhard optimization problems. The first problem is closely related to the bias variance tradeoff: one must tradeoff estimation of more parameters (bias reduction) with accurately estimating these parameters (variance reduction). This problem is independent of the computational power available to the learner. The second problem, that of finding a "best" hypothesis, is usually intractable and thus poses an added computational burden. For example, decision tree induction algorithms usually attempt to find a small tree that fits the data well, yet finding the optimal binary decision tree is NPhard. For artificial neural networks, the problem is even harder; the problem of loading a three node neural network with a training set is NPhard even if the nodes simply compute linear threshold functions.

Because the specific features are so application specific, there is no general theory for designing an effective feature set. There are a number of prior art approaches to feature subset selection. A filter approach attempts to assess the merits of features from the data, ignoring the learning algorithm. It selects features using a preprocessing step. In contrast, a wrapper approach includes the learning algorithm as a part of its evaluation function.

One of the filter approach called FOCUS algorithm (Almuallim H. and Dietterich T. G., Learning boolean concepts in the presence of many irrelevant features. Artificial Intelligence, 69(1-2):279-306, 1994.), exhaustively examines all subsets of features to select the minimal subset of features. It has severe implications when applied blindly without regard for the resulting induced concept. For example, in a medical diagnosis task, a set of features describing a patient might include the patient's social security number (SSN). When FOCUS searches for the minimum set of features, it could pick the SSN as the only feature needed to uniquely determine the label. Given only the SSN, any learning algorithm is expected to generalize poorly.

Another filter approach called Relief algorithm (I. Kononenko. Estimating attributes: Analysis and extensions of RELIEF. In L. De Raedt and F. Bergadano, editors, Proc. European Conf. on Machine Learning, pages 171-182, Catania, Italy, 1994. Springer-Verlag), assigns a "relevance" weight to each feature. The Relief algorithm attempts to find all weakly relevant features but does not help with redundant features. In real applications, many features have high correlations with the decision outcome, and thus many are (weakly) relevant, and will not be removed by Relief.

The main disadvantage of the filter approach is that it totally ignores the effects of the selected feature subset on the performance of the learning algorithm. It is desirable to select an optimal feature subset with respect to a particular learning algorithm, taking into account its heuristics, biases, and tradeoffs.

A wrapper approach (R. Kohavi and G. John. Wrappers for feature subset selection. Artificial Intelligence, 97(1-2), 1997) conducts a feature space search for evaluating features. The wrapper approach includes the learning algorithm as a part of their evaluation function. The wrapper schemes perform some form of state space search and select or remove the features that maximize an objective function. The subset of features selected is then evaluated using the target learner. The process is repeated until no improvement is made or addition/deletion of new features reduces the accuracy of the target learner. Wrappers might provide better learning accuracy but are computationally more expensive than the Filter methods.

It is shown that neither filter nor wrapper approaches is inherently better and that any practical feature selection algorithm needs to at least consider the learning algorithm used for classification and the metric used for evaluating the learning algorithm's performance (Tsamardinos, I. and C. F. Aliferis. Towards Principled Feature Selection: Relevancy, Filters, and Wrappers. in Ninth International Workshop on Artificial Intelligence and Statistics. 2003. Key West, Fla., USA.).

Unfortunately, there is a lack of computationally feasible method that considers the learning algorithm used for classification and there is a lack of adequate metric for evaluating the learning algorithm's performance.

Decision tree is a popular and powerful non-parametric decision learning and data mining method. Since a decision tree typically contains only a subset of the available features, decision trees could be used for feature selection. A prior art method introduced a semiflexible prediction method for feature selection using decision trees. Cardie (C. Cardie. "Using Decision Trees to Improve Case-Based Learning. In P. Utgoff, editor, Proceedings of the Tenth International Conference on Machine Learning," pages 25-32, University of Massachusetts, Amherst, Mass. Morgan Kaufmann, 1993) used a decision tree algorithm to select a subset of features for a nearest neighbor algorithm. The decision tree thus serves as the filter for the nearest neighbor algorithm. However, when faced with many irrelevant features, the hierarchical induction of decision tree algorithms is known to degrade in performance (decision accuracy).

The decision tree learning methods have been increasingly used in pattern recognition and data mining applications. They automatically select a subset of the features through the learning algorithms. Therefore, most prior art decision tree learning methods do not incorporate a feature selection step prior to the decision tree learning. The features used at each node of a decision tree learning algorithm are selected from all possible features based on the data pertaining to the node. The decision tree learning methods use a divide and conquer method and therefore suffer from data fragmentation and small sample size at deeper nodes. Thus, the features and decisions in the deep nodes could be unstable and are highly susceptive to noise. Furthermore, the features selected in the deeper nodes are highly dependent on the initial divide of the tree that could have bias or context switching effects. A different division in the first few nodes could yield a completely different feature choices and structures of the tree. Furthermore, learning from the complete feature set without prior selection could dramatically slow down the decision tree learning process since all features have to be considered at each node.

It is highly desirable to have a robust feature selection method that is optimized for hierarchical decision learning methods and can overcome the above difficulties.

Information integration methods for decision regulation in a hierarchic decision system are disclosed in U.S. patent application Ser. No. 09/972,057 entitled, "Regulation of Hierarchic Decisions in Intelligent Systems"; U.S. patent application Ser. No. 10/081,441 entitled, "Information Integration Method for Decision Regulation in Hierarchic Decision Systems".) The decision regulation method separates noise and application domain consistent characteristics and integrates multiple information to create robust ranking of decisions features and results that work well for the application despite of the application dynamics and errors in database (U.S. patent application Ser. No. 10/609,490 entitled, "Dynamic Learning and Knowledge Representation for Data Mining".) However, the methods do not include feature selection.

OBJECTS AND ADVANTAGES

This invention provides a feature regulation method for hierarchical decision learning systems that inputs a feature regulation training data and performs feature regulation using the feature regulation training data and invokes a plurality of the hierarchical decision learning to create feature subset information output. The feature regulation method further inputs a learning training data and performs feature sampling using the feature subset information and the learning training data to create feature subset learning training data output. It then performs hierarchical decision learning using the feature subset learning training data to create a hierarchical decision system output.

The primary objective of the invention is to perform feature selection using a feature regulation method designed specifically for hierarchical decision learning systems such as decision tree classifiers. Another objective of the invention is to provide a computationally feasible method for feature selection that considers the hierarchical decision learning systems used for decision making. The third objective of the invention is to provide adequate metric for evaluating the learner's performance in the feature selection including the stability of features subject to context switching and the reliability of the tree nodes by information integration. The fourth objective of the invention is to provide the ranking of the features. The fifth objective of the invention is to incorporate the feature ranks in the creation of the hierarchical decision learning systems.

SUMMARY OF THE INVENTION

A feature regulation application method for hierarchical decision learning systems receives a feature regulation training data. A feature regulation method uses the feature regulation training data and invokes a plurality of the hierarchical decision learning to create feature subset information output. The feature regulation application method also receives a learning data. A feature sampling method uses the feature subset information and the learning data to create a feature subset learning data output. A hierarchical decision learning method uses the feature subset learning data to create a hierarchical decision system output. The feature regulation method also outputs feature ranking information. A feature regulated hierarchical decision learning method uses the feature subset learning data and the feature ranking information to create a hierarchical decision system output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Application Scenarios

Figure 1:
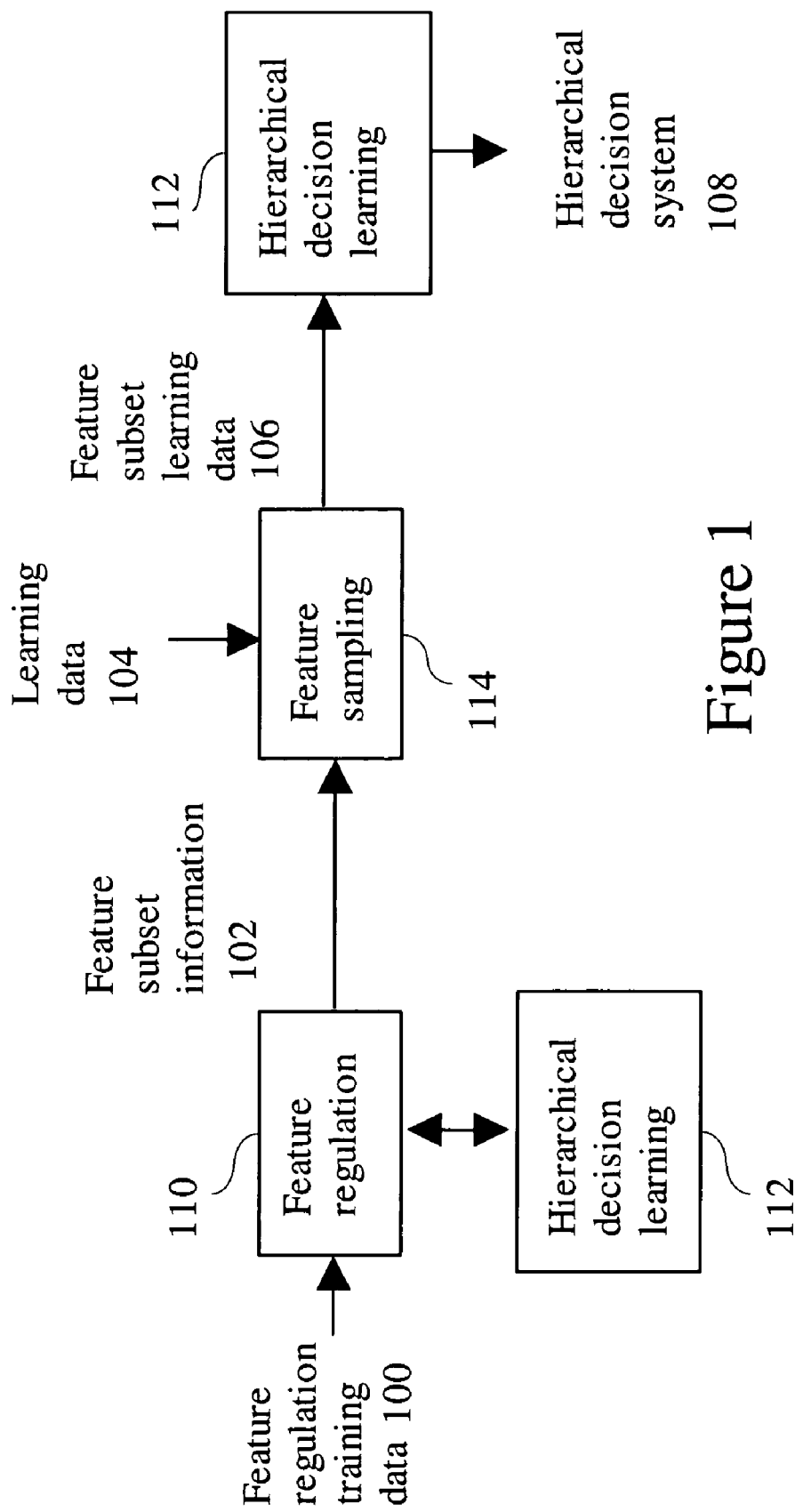
FIG. 1 shows the processing flow of the feature regulation application method for the hierarchical decision learning systems.

One feature regulation application scenario for the hierarchical decision learning systems is shown in FIG. 1.

As shown in FIG. 1, the feature regulation method for hierarchical decision learning systems inputs feature regulation training data 100 that contains the complete feature set. It performs feature regulation 110 using the feature regulation training data 100 and invokes the hierarchical decision learning 112 to create feature subset information 102 output. The feature subset information 102 is used to perform feature sampling 114 on a learning data 104 input. This results in feature subset learning data 106. The feature subset learning data 106 is used by a hierarchical decision learning 112 step to create the hierarchical decision system 108 output. The feature regulation 110 step uses the intended hierarchical decision learning 112 method for significant feature determination. Therefore, it is designed specifically for the intended hierarchical decision learning systems such as decision tree classifiers to improve the overall performance.

Figure 2:
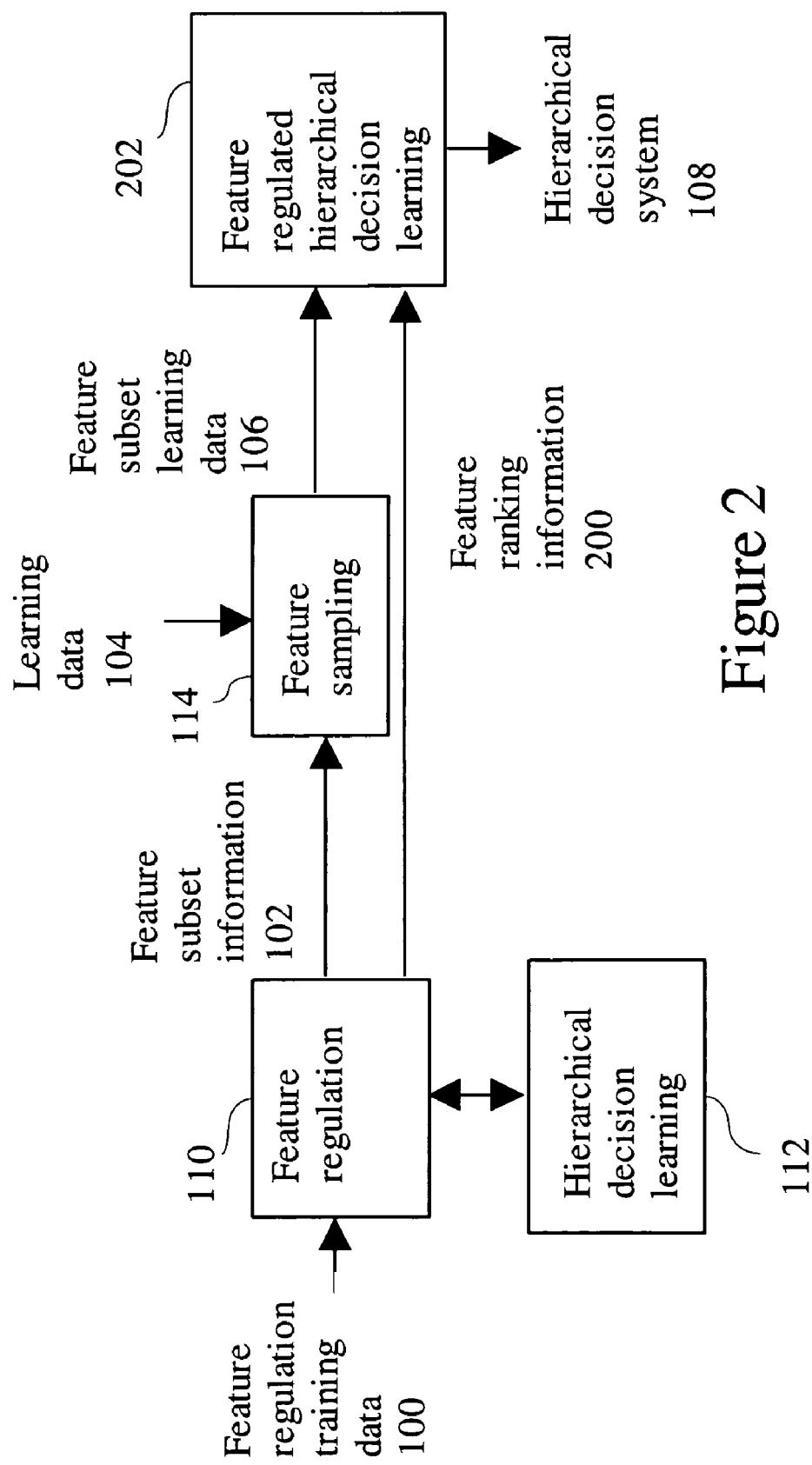
FIG. 2 shows the processing flow of an enhanced feature regulation application method for the hierarchical decision learning systems.

An enhanced feature regulation application scenario that uses the feature ranking information for hierarchical decision learning is shown in FIG. 2.

As shown in FIG. 2, the feature regulation method creates not only the feature subset information 102 output but also the feature ranking information 200 output. The feature subset information 102 is used to perform feature sampling 114 on a learning data 104 input. This results in feature subset learning data 106. The feature subset learning data 106 and the feature ranking information 200 is used by a feature regulated hierarchical decision learning 202 step to create the hierarchical decision system 108 output. The feature regulated hierarchical decision learning 202 step considers not only the subset features but also their ranking in the hierarchical decision learning.

II. Hierarchical Decision System

A hierarchical decision system such as a decision tree makes a decision through a hierarchical decision structures. A decision tree consists of at least one non-terminal node and at least as many terminal nodes as the number of decision outcomes to be decided. Each outcome has associated at least one terminal node, and the non-terminal nodes represent various collections of mixed outcomes. The root node represents the entire collection of outcomes into which a new sample may be decided.

Almost all decision trees are binary decision trees where each non-terminal node branches out two descendant nodes. Without loss of generality, we use binary decision tree classifiers in the descriptions of this invention. Those skilled of the art should recognize that the method of this invention is applicable to other type of decision trees or other types of parametric or non-parametric decision methods.

II.1 Binary Decision Tree Classifier

Figure 3:
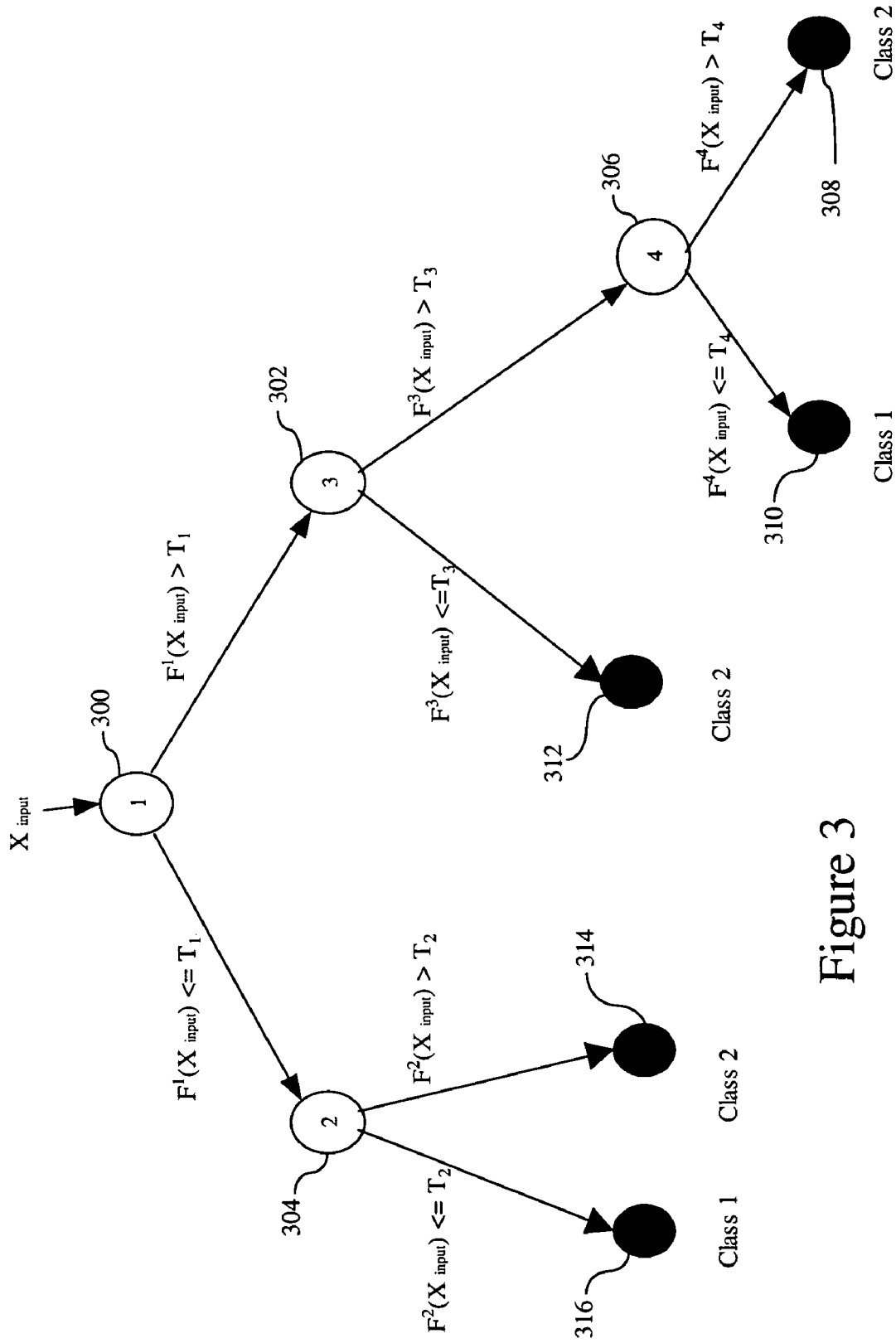
FIG. 3 shows the computational structure of a typical binary decision tree classifier.

FIG. 3 shows a typical binary decision tree classifier. A binary decision tree has two descendant paths (e.g. 302, 304 for node 300) for each non-terminal node. There is a decision rule associated with each non-terminal node to determine the descendant path for a sample at the node, until a terminal node is reached. The decision outcomes of a decision tree classifier 308, 310, 312, 314, 316 are classes associated with the input data. Examples of classes include disease types, defect classifications, weather patterns, etc.

In the classification mode, an unknown sample enters the decision tree at the root node 300 and the decision rule associated with the root node 300 is applied to the sample's feature vector to determine the descendant path that the sample will follow. This process is repeated until a terminal node (308, 310, 312, 314, or 316) is reached. Every terminal node has an associated class to which the sample is assigned.

The commonly used decision rule at each non-terminal node (300, 302, 304, or 306) is a thresholding of a discrimination function value at the node. In one embodiment of the invention, if the node's discrimination function value is less than or equal to a threshold value, the left child is taken; otherwise, the right child is taken for the descendant path. Feature thresholding is the simplest yet most easily understandable discrimination function. It selects a feature and uses its value for threshold. Other discrimination functions such as Fisher linear decision function, Bayes linear decision function, Bayes quadratic decision function and other single stage decision rules can also be used. Note that it is harder to interpret a decision tree when multiple features are involved in a discrimination function.

II.2 Hierarchical Decision Learning

In one embodiment of the invention, the hierarchical decision learning is performed by a binary decision tree construction procedure given a set of training data (samples). A binary decision tree can be constructed automatically by a divide and conquer procedure. All training samples are used to construct the root node. Each subsequent node is trained by a subset of the training samples. In the case of hierarchical decision learning for feature regulation, all features are used for the decision tree construction. In the case of hierarchical decision learning after feature regulation, only the feature subset selected by the feature regulation is used for the decision tree construction.

The decision tree construction procedure is as follows:

1. For a given node n with associated training sample set $U^n$, sort the samples in an ascending order according to their discrimination function values, i.e. $f(X_k^n) \leq f(X_{k+1}^n)$. In the case of feature thresholding method, the sorting is performed for each of the features that are available for the tree construction procedure. So that both feature and threshold value selection can be accomplished simultaneously.

2. A set of candidate thresholds $T^n$ is defined by $$T^n = \left\{ \frac{f(X_k^n) + f(X_{k+1}^n)}{2} \;\middle|\; Class^{k+1} \neq Class^k \right\}$$

3. For each partition at a candidate threshold, calculates the following parameters:

the weighted number of class c samples assigned to LEFT, $N_{Lc}$, and the weighted number of class c samples assigned to RIGHT, $N_{Rc}$.

$$N_{Lc} = \sum_{i \in \text{Class\_c\_in\_LEFT}} w_i^c$$

$$N_{Rc} = \sum_{j \in \text{Class\_c\_in\_RIGHT}} w_j^c$$

Where $w_i^c$ is the weighting factor for sample i belongs to class c.

The total weighted number of samples assigned to LEFT and RIGHT by the partition:

$$N_L = \sum_{c \in LEFT} N_{Lc}$$

$$N_R = \sum_{c \in RIGHT} N_{Rc}$$

Evaluation functions to be used for the partition selection at node n include

Purity (Entropy):

$$PR_n = \sum_{c \in \text{all\_Class\_in\_n}} (N_{Lc} \ln P_{Lc} + N_{Rc} \ln P_{Rc})$$

Where $P_{Lc} = \frac{N_{Lc}}{N_L}$ and $P_{Rc} = \frac{N_{Rc}}{N_R}$.

Purity has the maximum value when the training samples are completely separated in LEFT and RIGHT.

Other criteria can be used for evaluation function include the probability of correct classification.

In the case of feature regulated hierarchical decision learning as described in FIG. 2, the feature ranking information is included in the evaluation function. In one embodiment of the invention, the feature ranking information creates a feature weight $W_{fi}$ for feature fi. The evaluation function for a node n, Evaluate$_n$, is weighed by the feature weight of its associated feature. That is, the feature regulated evaluation function, $$\text{Evaluate}^{FR}{}_n = \text{Evaluate}_n * W_{fi}$$

The weight $W_{fi}$ for feature fi can be generated by any functions that uses the feature ranking information. In one embodiment of the invention, assuming that there are R number of features being ranked from 1 (best) to R (worst), the weight $W_{fi}$ for feature fi is computed by the following algorithm:

$$W_{fi} = \frac{R - r_i + 1}{R}$$

4. Select the partition for node n as the one that maximizes the evaluation function.
5. Check the following stopping criteria (OR conditions):
   Reached the maximum allowable level of tree: $L=\log_2 N-1$ or a user specified limit. Where N is the total number of training sample.
   $\chi^2$ value is smaller than an allowable limit.
   Where $$\chi^2 = \sum_{c \in \text{all\_Class\_in\_n}} N_{Lc} \ln P_{Lc} + N_{Rc} \ln P_{Rc} - N_c^n \ln \frac{N_c^n}{N^n} \text{ and } N_c^n$$

weighted number of samples of class c at node n. $N^n$ is the total weighted number of samples at node n.
$N^n$ value is smaller than an allowable limit
Type I error>limit. Where type I error is the probability that a sample whose true class is in LEFT yet is classified as RIGHT class
Type II error>limit. Where type II error is the probability that a sample whose true class is in RIGHT yet is classified as LEFT class
6. If none of the stopping criteria is met, assign node n as a non-terminal node and use the step 4 selected partition for this node
7. If at least one of the stopping criteria is met, assign node n as a terminal node, and assign most probable class from its associated training samples.

II.3 Rule Ranking Score

The terminal nodes of a decision tree represent decision rules. The decision tree may have many terminal nodes derived from a large training set. It is desirable to determine and rank the goodness of the rules. For a terminal node n in a decision tree, prior art approach uses only $N_c^n$ the weighted class c training sample count at this node n to derive rules for classification or a node effectiveness estimate. This invention uses additional information that characterizes the global and population statistics of the data for classification and node effectiveness estimation. In one embodiment of the invention, up to four types of information are used for each node: local counts, local population statistics, global counts and global population statistics.

II.3.1 Global Characteristics and Population Characteristics

II.3.1.1 Local Counts

These include the same information as that of the prior art approach. They consist of $N_c^n$, the weighted class c training sample count at a node n.

II.3.1.2 Local Population Statistics

These include $P_c^n$, the weighted class c training sample proportion at a node n. Where $$P_c^n = \frac{N_c^n}{\sum_{i \in \text{Class\_c\_in\_all\_training\_samples}} w_i^c}.$$

In the case that all classes have the same weighted training sample counts, the local counts and local population statistics contain essentially the same information. However, when the weighted training sample counts are different for different classes, the $P_c^n$ will have higher relative value for classes with smaller training sample counts. Therefore, local population statistics provide a prevalence independent characterization of the node n. This information could be used to avoid the systematic misclassification of samples from low prevalence classes. This is especially important for correct rare event classification or correctly classifying the classes whose training samples are limited.

II.3.1.3 Global Counts

For each node n except the root node, there exists a parent node p. Let $f^p(x) \geq 0$ be the decision rule of node p that leads to node n when satisfied. Let $G^n$ be the global training sample set associated with node n. The global counts consist of $G_c^n$ the weighted class c training sample count for the samples in $G^n$ that satisfy the decision rule $f^p(x) \geq 0$. In one embodiment of the invention, $G^n$ is defined as the training samples that are up to k layers above node n. When k=1, $G^n$ includes the training samples in the parent node p, i.e. $G^n = U^p$. In this case, the global counts are identical to the local counts, that is $G_c^n = N_c^n$. When k>1, additional samples above the parent node p are included. A larger k includes more global contexts of the node n. When k is sufficiently large, $G^n$ can include all training samples as its global context. Therefore the global context coverage can be adjusted using different layer depths.

Those skilled in the art should recognize that other methods of defining $G^n$ can be used in the invention. For example, a minimum number of training samples or a proportion of total samples rather than the layer k can be used to define the global training sample set $G^n$.

II.3.1.4 Global Population Statistics

These include $g_c^n$, the weighted global class c training sample proportion at a node n.

Where $g_c^n = \dfrac{G_c^n}{\sum_{i \in \text{Class\_c\_in\_all\_training\_samples}} w_i^c}$ In the case that all classes have the same weighted training sample counts, the global counts and global population statistics contain basically the same information. However, when the weighted training sample counts are different for different classes, the $g_c^n$ will have higher relative value for classes with smaller training sample counts. Therefore, global population statistics provide a prevalence independent global characterization of the node n. This information is used to avoid the systematic misclassification of samples from low prevalence classes.

III.1.2 Rule Ranking by Information Integration

The global and population characteristics of this invention provide a framework for rule ranking that discriminates between noise and consistent application characteristics. It also allows a correction for prevalence discrepancy in the training data. Without loss of generality, rule ranking for a classification tree is discussed. Rule ranking for regression trees can be achieved using similar methods.

In one embodiment of the invention, to rank rules in a classification tree, a class confidence value is derived from each type of the characteristics for each terminal node. The confidence value for a class c is defined as the ratio between the characteristic value of the class c and that of all classes.

The local count confidence for class c in a terminal node n is defined as:

$$LC_c^n = \frac{N_c^n}{\sum_{c \in All\_Classes\_in\_n} N_c^n}.$$

Similarly, the local population confidence for class c in a terminal node n is defined as:

$$LP_c^n = \frac{P_c^n}{\sum_{c \in All\_Classes\_in\_n} P_c^n}.$$

The global count confidence for class c in a terminal node n is defined as:

$$GC_c^n = \frac{G_c^n}{\sum_{c \in All\_Classes\_in\_n} G_c^n};$$

and the global population confidence for class c in a terminal node n is defined as:

$$GP_c^n = \frac{g_c^n}{\sum_{c \in All\_Classes\_in\_n} g_c^n}.$$

In one embodiment of the invention, an integrated confidence value $IC_c^n$ for a class c in a terminal node is defined as a weighted combination of the class c confidence values by the following rule:

$$IC_c^n = a*LC_c^n + b*LP_c^n + c*GC_c^n + d*GP_c^n$$

Where a, b, c and d are weights for integration. The weights a, b, c and d allow for great flexibility in decision strategy that can be selected to suit an application. When b, c and d are set to 0, the integrated results degenerate to the prior art approach that relies solely on local counts. When a and c are set to 0, a new training class prevalence independent decision strategy is created. When c and d are set to 0, a training class prevalence corrected local based decision strategy is created. Similarly, when a and b are both set to 0, a training class prevalence corrected global based decision strategy is created. Furthermore, the global context coverage can be adjusted using different layer depth k as defined in III.1.1.3. These parameter adjustments are ideal to tailor the ranking for different levels of interactive data mining. Large k values are used for overview, moderate k values are used for zoom, low k values are used for details. Depending on the filtering, different k values may be used. Similarly, the adjustment of a, b, c, and d allow different levels of focus between overview to details.

The integrated confidence value could be used to rank different decision rules.

In addition, integrated confidence values could be used for ranking to achieve a good balance between local and global characteristics. Comparing the local, global, count and population confidences $LC_c^n$, $LP_c^n$, $GC_c^n$, $GP_c^n$ could identify unreliable nodes. In a preferred embodiment of the invention, four confidence ratios are defined:

$$\frac{LP_c^n}{(LC_c^n + LP_c^n)}, \frac{GC_c^n}{(LC_c^n + GC_c^n)}, \frac{GP_c^n}{(LP_c^n + GP_c^n)}, \frac{GP_c^n}{(GC_c^n + CP_c^n)}.$$

$$\frac{LP_c^n}{(LC_c^n + LP_c^n)}$$

measures the local population effect. If the value is significantly different from 0.5, there is a mismatch between local count and local population based decision. So the results may not be reliable. In the preferred embodiment of the invention, a local population reliability measure $R_{LP}$ is defined as $$R_{LP} = 1 - 2*\left|\frac{LP_c^n}{(LC_c^n + LP_c^n)} - 0.5\right|.$$

$$\frac{GC_c^n}{(LC_c^n + GC_c^n)}$$

measures the global and local count difference effect. If the value is significantly different from 0.5, there is a mismatch between the global and local count based decision. So the results may not be reliable. In one embodiment of the invention, a count reliability measure $R_c$ is defined as $$R_c = 1 - 2*\left|\frac{GC_c^n}{(LC_c^n + GC_c^n)} - 0.5\right|.$$

$$\frac{GP_c^n}{(LC_c^n + GC_c^n)}$$

measures the global and local population effect. If the value is significantly different from 0.5, there is a mismatch between global and local population based decisions. So the results may not be reliable. In one embodiment of the invention, a population reliability measure $R_P$ is defined as $$R_P = 1 - 2 * \left|\frac{GP_c^n}{(LP_c^n + GP_c^n)} - 0.5\right|.$$

$$\frac{GP_c^n}{(GC_c^n + GP_c^n)}$$

measures the global population effect. If the value is significantly different from 0.5, there is a mismatch between global count and global population based decisions. So the results may not be reliable. In one embodiment of the invention, a global population reliability measure $R_{GP}$ is defined as $$R_{GP} = 1 - 2 * \left|\frac{GP_c^n}{(GC_c^n + GP_c^n)} - 0.5\right|.$$

In one embodiment of the invention, a combined reliability measure R can be defined as:

$$R = w_{LP}R_{LP} + w_c R_c + w_P R_P + w_{GP}R_{GP}$$

Where $w_{LP}$, $w_c$, $w_P$, $w_{GP}$ are combination weighting factors.

Those skilled in the art should recognize that other reliability measures and other methods of reliability combination such as nonlinear functions can be used. Some examples are as follows:

$$1 - 2 * \left|\frac{GP_c^n}{(LC_c^n + GP_c^n)} - 0.5\right|, 1 - 2 * \left|\frac{GC_c^n}{(LP_c^n + GC_c^n)} - 0.5\right|.$$

Furthermore, other methods of reliability combination such as nonlinear functions can be used in the invention.

A new rule ranking score can be defined as a combination of the integrated confidence value and the reliability value. In one embodiment of the invention, the combination is done by the following rule $$RR = w_R R + w_C IC.$$

Where $w_R$ and $w_c$ are weighting factors. Those skilled in the art should recognize that other methods of combination such as nonlinear functions can also be used. For example:

$$RR = \text{Max}(R, IC) \text{ or}$$

$$RR = \text{Min}(R, IC)$$

III. Feature Regulation

Figure 4:
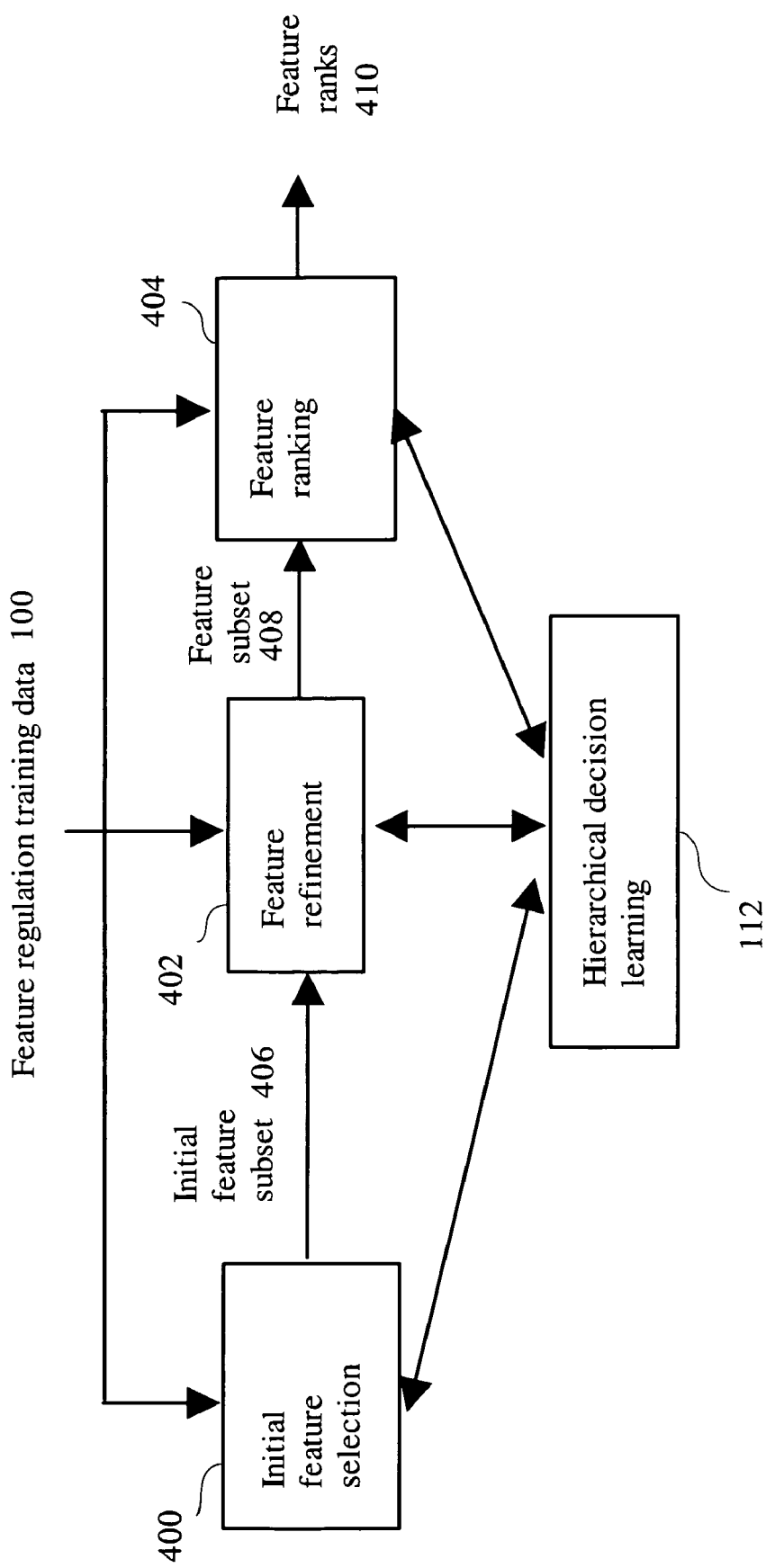
FIG. 4 shows the processing flow for the feature regulation method.

The feature regulation method for hierarchical decision learning systems inputs feature regulation training data 100 that contains the complete feature set. It performs feature regulation 110 using the feature regulation training data 100 and invokes the hierarchical decision learning 112 to create feature subset information 102 output. In addition, the feature regulation 110 method could also contain the feature ranking information 200 output. In one embodiment of the invention, the feature regulation 110 method includes three steps: initial feature selection, feature refinement, and feature ranking. The processing flow of the feature regulation method is shown in FIG. 4.

The initial feature selection 400 step inputs the feature regulation training data 100 to create the initial feature subset 406 output. This step is most effective when the complete feature set is large. It could be skipped and the feature refinement step could be directly applied. The feature refinement 402 step performs refined feature selection using either the initial feature subset 406 or the complete feature set. It outputs the feature subset 408 that is used by the feature ranking 404 method to rank the features. This results in the feature ranks 410 output for the feature subset.

III.1 Initial Feature Selection

Figure 5:
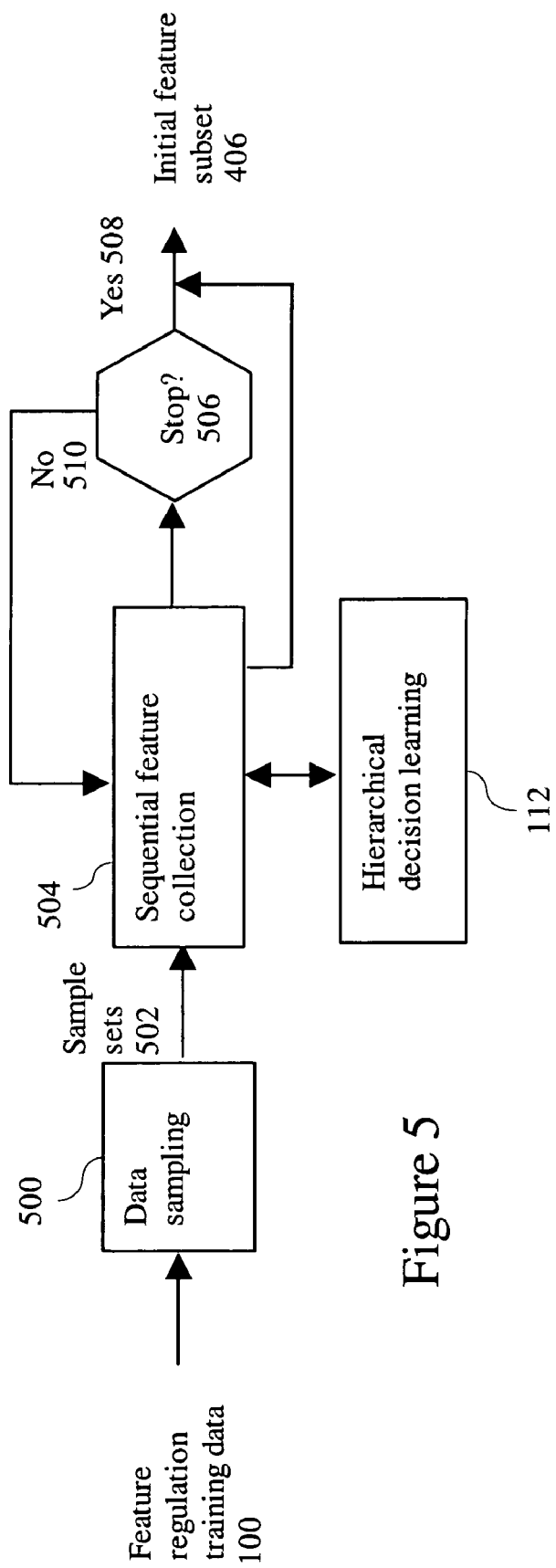
FIG. 5 shows the processing flow for the initial feature selection method.

The processing flow of the initial feature selection step is shown in FIG. 5. The initial feature selection method inputs the feature regulation training data 100 to create a subset of features for feature refinement. The initial feature selection method includes a data sampling 500 step followed by a sequential feature collection 504 step that sequentially collects discriminate features derived from hierarchical decision learning 112. A check of the stopping criteria 506 is performed at each iteration of the sequential feature collection 504. When the stopping criterion is met 508, the collected features are used as the initial feature subset 406 and the process is completed. Otherwise 510, the sequential feature collection 504 step continues to the next iteration.

III.1.1 Data Sampling

The data sampling 500 step is applied to sample the feature regulation training data 100 into a plurality of sample sets 502 for sequential feature collection 504. In one embodiment of the invention, the data sampling 500 step divides the feature regulation training data 100 into S equal sized mutually exclusive sample sets 502. The number S is selected depending on the size of the feature regulation training data 100 and the number of desired features to be selected. The sampling could be performed by random selection or by stratified selection. Furthermore, the sample sets do not have to be mutually exclusive neither do they have to be of equal size.

Those skilled in the art should recognize that the data sampling 500 step may not have to be performed. In this case, the sample sets 502 contain only the original feature regulation training data 100.

III.1.2 Sequential Feature Collection

In one embodiment of the invention, the sequential feature collection 504 comprises the following steps:

1. Initialize the initial feature subset to the empty set;
2. Select the first sample set;
3. Given the selected sample set, perform hierarchical decision learning excluding the features included in the initial feature subset. The learning constructs a shallow tree of maximum depth H;
4. Select the features used in the shallow tree and add them to the initial feature subset;
5. If the number of features in the initial feature subset is equal to or greater than the desired feature count C, exit the process. Otherwise, go to step 6;

6. Select the next sample set. If all sample sets are used, recycle the sample set following the same order as their first use. Repeat steps 3-5.

Step 1 initializes the initial feature subset to the empty set where selected features will be added at each iteration of the sequential feature collection process. An order of sample sets is assigned by the data sampling step. The order could be based on the chronology of data acquisition, the sampling strategy, or random assignment. Step 2 selects the first sample set as the initial set for the first iteration of the sequential feature collection. Step 3 performs hierarchical decision learning using the selected sample set. In one embodiment of the invention, a binary decision tree classifier construction process uses all not-yet-selected features (that is, the already selected features that are included in the initial feature sunset are excluded) is performed. The exclusion of the already selected features enables context switching that forces the use of new features for tree creation. It is intended to select only a small number of significant features from each of the feature collection iteration. Therefore, only a shallow tree of maximum depth H is built where H should be a small number. For example, a binary decision tree with H=3 consists of up to 3 non-terminal nodes and therefore, up to 3 features could be collected. The selection of H depends on the desired feature count C and the sample set count S. In one embodiment of invention, we select H so that $(2^{H-1}-1)*S<=C$. This assures that all sample sets will be used at least once before reaching the stopping condition. Step 4 selects the features used in the tree of the current iteration and adds them to the initial feature subset. Therefore, the initial feature subset is increased at each iteration. Step 5 checks the stopping condition. In one embodiment of the invention, we check the number of collected features against the desired feature count C. Other stopping criterion could be used. As an example, we could check the number of iterations performed. Step 6 is invoked only when the stopping condition is not met in step 5. In step 6, the next sample set is selected and the next iteration (steps 3 to 5) is initiated. If all sample sets are used, the used sample sets are recycled.

III.2 Feature Refinement

Figure 6:
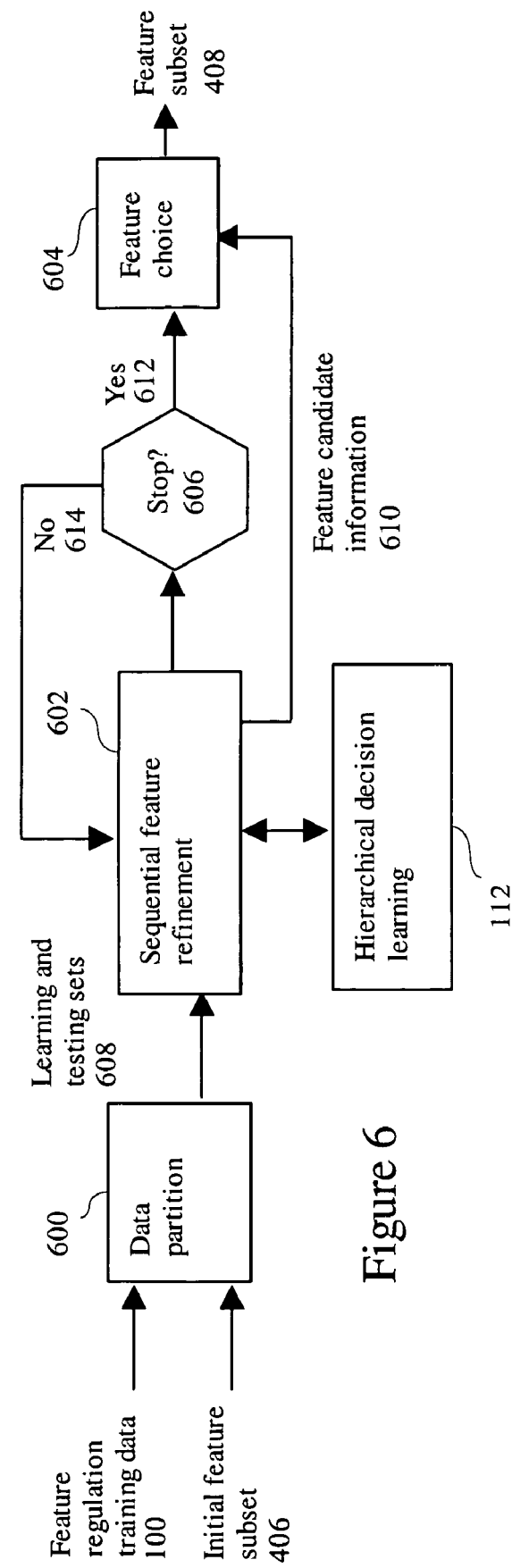
FIG. 6 shows the processing flow for the feature refinement method.

The processing flow of the feature refinement step is shown in FIG. 6. The feature refinement step inputs the feature regulation training data 100 and the initial feature subset 406 (in the case that initial feature selection is performed) to create a feature subset 408 for hierarchical decision learning 112 or feature ranking 404. The feature refinement method includes a data partition 600 step followed by a sequential feature refinement 602 step that performs iterative refinement collection of discriminate features through hierarchical decision learning 112. A check of the stopping criteria 606 is performed at each iteration of the sequential feature refinement 602 step. When the stopping criterion is met 612, the collected feature candidate information is used by a feature choice 604 step to select the feature subset 408. Otherwise 614, the sequential feature refinement 602 step continues to the next iteration.

The data partition 600 step extracts only the features included in the initial feature subset 406 for the processing. It then divides the training data into a learning and a testing set 608. In one embodiment of the invention, ⅓ of data are randomly selected as the testing set and the remaining data are used as the learning set. Those skilled in the art should recognize that other methods of data partition with the same or different learning/testing proportion could be used. Furthermore, the learning and testing sets could be dynamically determined by the rotation method that is often used in statistical cross-validation.

In one embodiment of the invention, the sequential feature refinement 602 comprises the following steps:

1. Initialize the root node feature subset to the empty set;
2. Initialize the goodness values of all candidate features to 0;
3. Given the learning set, perform hierarchical decision learning excluding the features included in the root node feature subset. The learning constructs a shallow tree of maximum depth D;
4. Apply the testing set to the tree and determine the accuracy to the testing set;
5. Add the feature used in the root node into the root node feature subset;
6. For the non root node features used in the tree, add the above determined accuracy value to their goodness values;
7. Repeat steps 3-6 until the desired number of iterations is reached.

Step 1 initializes the root node feature subset to the empty set where a root node feature will be added at each iteration of the sequential feature refinement process. Step 2 initializes the goodness values of all candidate features to 0. The candidate features are the features included in the initial feature subset. Step 3 performs hierarchical decision learning using the learning set. In one embodiment of the invention, a binary decision tree classifier construction process is performed using all non root node features. The exclusion of the root node features allows the context switching effect since a new root node would use different features and criteria in its tree construction. In addition to the root node feature, it is intended to add the contribution of a small number of additional features from each of the feature refinement iteration. Therefore, only a shallow tree of maximum depth D is built where D should be a small number. For example, a binary decision tree with D=3 has up to 3 non-terminal nodes and therefore, could have up to 2 additional features in addition to the root node feature. The features will be assessed and added to their goodness values. Step 4 applies the testing set to the tree and determines the tree accuracy to the testing set. The accuracy value is used in one embodiment of the invention as the goodness values for the associated non root node features used in the tree. Those skilled in the art should recognize that other criteria such as the learning set accuracy or non accuracy criteria could be used as the goodness measure. Step 5 adds the feature used in the root node into the root node feature subset. Step 6 adds the accuracy value determined from step 4 to each of their respective goodness values of the non root node features used in the tree. Step 7 checks the stopping condition. In one embodiment of the invention, the number of iteration is checked against the number of desired iterations. Other stopping condition could be used. For example, we could check the accumulated number of features having non-zero goodness values.

After the stopping criterion is met, the feature candidate information 610 including the feature goodness values and the root node feature subset are used by the feature choice 604 step to generate the feature subset 408. The goodness values of all non root node features are ranked in the feature choice 604 step. The feature choice 604 step creates the resulting feature subset 408 includes all root node features and the desired number of high ranked non root node features.

III.3 Feature Ranking

Figure 7:
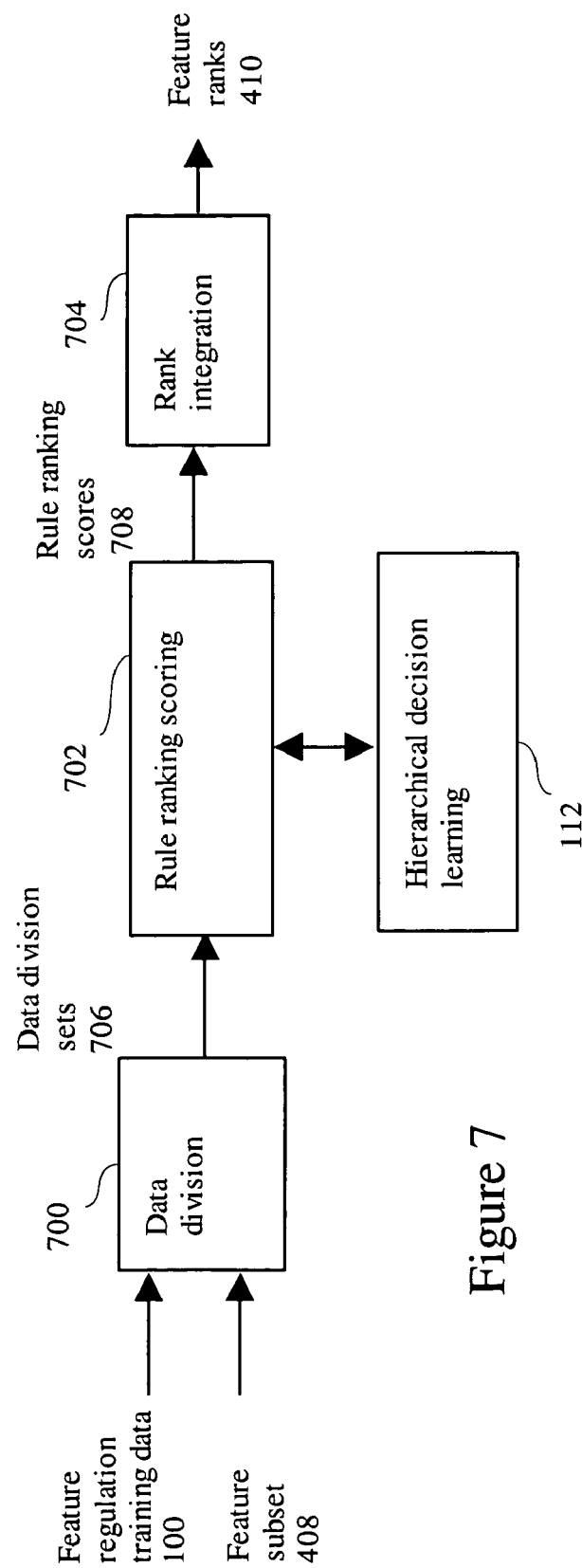
FIG. 7 shows the processing flow for the feature ranking method.

The processing flow of the feature ranking step is shown in FIG. 7. The feature ranking method inputs the feature regulation training data 100 and the feature subset 408 to create the feature ranks 410. The feature ranking method includes a data division 700 step that creates data division sets 706. The data division sets 706 are used by a rule ranking scoring 702 step to create rule ranking scores 708 for the terminal nodes of the tree of each of the data division sets 706. The rule ranking scores 708 are used by a rank integration 704 step to create the feature ranks 410.

The data division step 700 extracts only the features included in the feature subset 408 for the processing. It then divides the training data into a desired number of data division sets 706. In one embodiment of the invention, the data are randomly divided into 3 mutually exclusive data division sets. Other methods of data division could be used and they are all within the scope of this invention.

The rule ranking scoring 702 step is applied to each of the data division sets 706. It performs hierarchical decision learning 112 to build a tree with an appropriate depth that is close to the desired tree depth of the final hierarchical decision system 108. It then generates rule ranking scores 708 for the terminal nodes. In one embodiment of the invention, the information integration based method as described in section II.3 is used to create rule ranking scores 708.

After the decision trees and their terminal node rule ranking scores are generated for all data division sets, a rank integration 704 step integrates the rule ranking scores 708 for each feature used in any of the trees.

In one embodiment of the invention, the rule ranking scoring 702 method comprises the following steps:

1. Initialize the integrated feature ranking score values of all candidate features to 0.
2. For each of the trees correspond to the data division sets
    a. For each non-terminal node of the tree
        i. Identify its associated feature.
        ii. Add up the rule ranking scores for all of the descendant terminal nodes. This results in the total ranking score for the non-terminal node.
        iii. Add the integrated feature ranking score value of the node associated feature by the total ranking score Step 1 initializes the integrated feature ranking score values of all candidate features to 0. The integrated feature ranking score values are updated in step 2. Step 2 processes through all non-terminal nodes of all trees. For each non-terminal node, the integrated feature ranking score value is determined and used to update the integrated feature ranking score of the feature associated with the non-terminal node. The integrated feature ranking score value is the total ranking scores of all descendant terminal nodes of the non-terminal node. Therefore, the root node feature will have total rule ranking score of all terminal nodes of the tree. This weighs higher for the features of earlier (ancestry) nodes than the deeper (offspring) nodes.

In one embodiment of the invention, the terminal node rule ranking score is normalized for each tree. So each tree contributes equally in the integrated feature ranking score determination.

After the feature ranking score of all non-terminal nodes features of all trees are integrated, the features are ranked by their integrated feature ranking score values. This results in the feature ranks output.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. An initial feature selection method for hierarchical decision learning systems in pattern recognition and data mining applications to automatically select a subset of features for learning that results in better performance than using all features for learning comprises the steps of:
    a) Input a feature regulation training data;
    b) Perform one iteration of the sequential feature collection using the feature regulation training data and invokes the hierarchical decision learning to create initial feature subset output;
    c) Check the stopping criterion to complete the iteration or proceed to the next iteration and output the initial feature subset for hierarchical decision learning in pattern recognition and data mining applications when the stopping criterion is met.

2. The initial feature selection method for hierarchical decision learning systems of claim 1 further comprises a data sampling step that samples the feature regulation training data into a plurality of sample sets.

3. The initial feature selection method for hierarchical decision learning systems of claim 2 wherein the sequential feature collection method comprises the steps of:
    a) Initialize the initial feature subset to the empty set;
    b) Select the first sample set;
    c) Given the selected sample set, perform hierarchical decision learning excluding the features included in the initial feature subset to build a shallow tree;
    d) Select the features used to build the shallow tree and add them into the initial feature subset;
    e) If the number of the features in the initial feature subset is equal to or greater than the desired feature count, exit, Otherwise, continue on step (f);
    f) Select the next sample set, If all sample sets are used, recycle the sample set following the same order as their first use, Repeat steps (c), (d), and (e).

4. A feature refinement method for hierarchical decision learning systems in pattern recognition and data mining applications to automatically select a subset of features for learning that results in better performance than using all features for learning comprises the steps of:
    a) Input a feature regulation training data;
    b) Perform data partition of the feature regulation training data into learning and testing sets;
    c) Perform one iteration of the sequential feature refinement using the learning and testing sets and invokes the hierarchical decision learning to create feature candidate information output;
    d) Check the stopping criterion to complete the iteration or proceed to the next iteration;
    e) Perform feature choice using the feature candidate information to create the feature subset wherein the feature subset is used for hierarchical decision learning in pattern recognition and data mining applications.

5. The feature refinement method for hierarchical decision learning systems of claim 4 wherein the sequential feature refinement method comprises the steps of:
    a) Initialize the root node feature subset to the empty set;
    b) Initialize the goodness values of all candidate features to 0;

c) Given the learning set, perform hierarchical decision learning excluding the features included in the root node feature subset to build a shallow tree;
d) Apply the testing set to the tree and determine the accuracy to the testing set;
e) Add the feature used in the root node into the root node feature subset;
f) For the non root node features used in the tree, add the above determined accuracy value to their goodness values;
g) Repeat steps (c), (d), and (e) until the desired number of iterations is reached.

6. A feature ranking method for hierarchical decision learning systems in pattern recognition and data mining applications to automatically select a subset of features for learning that results in better performance than using all features for learning comprises the steps of:
a) Input a feature regulation training data;
b) Input a feature subset;
c) Perform data division of the feature regulation training data into data division sets;
d) Perform rule ranking scoring using the data division sets and invokes the hierarchical decision learning to create rule ranking scores output;
e) Perform Rank integration using the rule ranking scores to create feature ranks wherein the feature ranks are used for hierarchical decision learning in pattern recognition and data mining applications.

7. The feature refinement method for hierarchical decision learning systems of claim 6 wherein the rule ranking scoring method comprises the steps of:
a) Initialize the integrated feature ranking score values of all candidate features to 0;
b) For each of the trees corresponds to the data division sets a. For each non-terminal node of the tree
i. Identify its associated feature;
ii. Add up the rule ranking scores for all of the descending terminal nodes, This results in the total ranking score of the non-terminal node;
iii. Add the integrated feature ranking score value of the node associated feature by the total ranking score.

8. The feature refinement method for hierarchical decision learning systems of claim 6 wherein the rule ranking scoring method uses information integration.

* * * * *